(12) United States Patent
Channapattan et al.

(10) Patent No.: US 10,942,780 B1
(45) Date of Patent: Mar. 9, 2021

(54) RESOURCE USE AND OPERATIONAL LOAD OF PERFORMING COMPUTING AND STORAGE TASKS IN DISTRIBUTED SYSTEMS

(71) Applicant: Twitter, Inc., San Francisco, CA (US)

(72) Inventors: Vrushali Channapattan, Santa Clara, CA (US); Joep Rottinghuis, Redwood City, CA (US)

(73) Assignee: Twitter, Inc., San Francisco, CA (US)

( * ) Notice: Subject to any disclaimer, the term of this patent is extended or adjusted under 35 U.S.C. 154(b) by 173 days.

(21) Appl. No.: 15/985,367

(22) Filed: May 21, 2018

(51) Int. Cl.
*G06F 9/46* (2006.01)
*G06F 9/50* (2006.01)
*G06F 11/34* (2006.01)

(52) U.S. Cl.
CPC ............ *G06F 9/505* (2013.01); *G06F 9/5077* (2013.01); *G06F 9/5083* (2013.01); *G06F 11/3419* (2013.01); *G06F 11/3433* (2013.01); *G06F 11/3442* (2013.01)

(58) Field of Classification Search
CPC ...... G06F 9/505; G06F 9/5077; G06F 9/5083; G06F 11/3419; G06F 11/3433; G06F 11/3442
See application file for complete search history.

(56) References Cited

U.S. PATENT DOCUMENTS

| | | | |
|---|---|---|---|
| 9,471,391 B1 * | 10/2016 | Abramson | G06F 9/5072 |
| 10,355,946 B1 | 7/2019 | Dolas et al. | |
| 10,356,167 B1 | 7/2019 | Dolas et al. | |
| 2006/0167984 A1 * | 7/2006 | Fellenstein | G06Q 10/06375 709/203 |
| 2007/0220516 A1 * | 9/2007 | Ishiguro | G06F 9/505 718/101 |
| 2016/0026952 A1 * | 1/2016 | Cancilla | G06T 19/20 705/7.38 |
| 2018/0210763 A1 * | 7/2018 | Kumar | G06F 9/5033 |

OTHER PUBLICATIONS

Auburn.instructure.com [online], "Hadoop Illuminated," Jan. 1, 2014, [retrieved on Jan. 10, 2019], retrieved from URL <https://auburn.instructure.com/files/60173850/download?download_frd=1&verifier=H1K8DwAIkSpb6Mg9jPWN13hh1xY1gVhBB14d-ZG3Q>, 72 pages.

(Continued)

*Primary Examiner* — Tammy E Lee
(74) *Attorney, Agent, or Firm* — Fish & Richardson P.C.

(57) ABSTRACT

Methods, systems, and apparatus, including computer programs encoded on computer storage media, for performing computing and storage tasks in distributed systems. One of the methods includes obtaining multiple resource use information items associated with performance of a group of tasks on a distributed computing framework having multiple clusters; for each task of the group of tasks having a corresponding task type, determining a measure of operational load of performing the task on the distributed computing framework based on the selected resource use information items associated with the task and one or more unit measures associated with the task; combining each measure of operational load to compute a combined measure of operational load for performing the group of tasks on the distributed computing framework; identifying one or more properties of the group of tasks that indicate a need to adjust the combined measure; and adjusting the combined measure of operational load.

15 Claims, 7 Drawing Sheets

(56) References Cited

OTHER PUBLICATIONS

Github.com [online], "hRaven," Oct. 14, 2016, [retrieved on Jan. 10, 2019], retrieved from URL <https://github.com/twitter/hraven/blob/master/README.md>, 4 pages.

Hindman et al., "Mesos: a Platform for Fine-Grained Resource Sharing in the Data Center," Proceedings of the 8th USENIX Conference on Networked Systems Design and Implementation, Mar. 30-Apr. 1, 2011, 14 pages.

Shvachko et al., "The Hadoop Distributed File System," 2010 IEEE 26th Symposium on Mass Storage Systems and Technologies (MSST), May 2010, 10 pages.

Slideshare.net/HadoopSummit [online], "Show Me the Money! Cost and Resource Tracking for Hadoop & Storm," Jun. 30, 2016, [retrieved on May 5, 2017], retrieved from URL <https://www.slideshare.net/HadoopSummit/show-me-the-money-cost-resource-tracking-for-hadoop-and-storm>, 38 pages.

The Morning Paper [online], "CherryPick: Adaptively Unearthing the Best Cloud Configurations for Big Data Analytics," available on or before May 4, 2017, via Internet Archive: Wayback Machine URL <https://web.archive.org/web/20170505053758/https://blog.acolyer.org/2017/05/04/cherrypick-adaptively-unearthing-the-best-cloud-configurations-for-big-data-analytics/>, [retrieved on May 5, 2017], retrieved from URL <https://blog.acolyer.org/2017/05/04/cherrypick-adaptively-unearthing-the-best-cloud-configurations-for-big-data-analytics/> 8 pages.

Vavilapalli et al., "Apache Hadoop YARN: Yet Another Resource Negotiator," ACM Symposium on Cloud Computing (SOCC), Oct. 1-3, 2013, 16 pages.

\* cited by examiner

RESOURCE USE AND OPERATIONAL LOAD OF PERFORMING COMPUTING AND STORAGE TASKS IN DISTRIBUTED SYSTEMS

BACKGROUND

This specification relates to monitoring and calculating resource usage, and allocating resources in distributed computing system.

Conventional distributed computing systems assign computing resources to perform particular computing tasks. A task is a combination of one or more operations performed by at least one component of a computing system, such as a processing task, a storage task, or a data access task. Different assigned resources include processing resources and storage resources. Estimating resource use and operational load of performing computing tasks is important for detecting tasks that impose a high resource burden on computer systems and improving the performance of those systems.

SUMMARY

This specification describes technologies for performing computing and storage tasks in distributed computing systems. These technologies generally involve estimating resource loads associated with performing a given task based on performance data and a resource model. Resource load estimates for jobs can be based on the type of task, for example, an execution task, an access task, or a storage task. A unit measure of performance load of a particular task for a cluster can be an estimate of the resource cost of performing tasks using a specified portion of the resources of the cluster and for a specified amount of time. For example, a unit measure of execution load for a cluster can be an estimate of resource load, e.g., memory load, processor load, or both, of executing jobs using all available resources of the cluster during a specified time period, e.g., 24 hours. The system can adjust a unit measure of performance load to incentivize or disincentivize particular actions by users.

In general, one innovative aspect of the subject matter described in this specification can be embodied in methods that include the actions of obtaining multiple resource use information items associated with performance of a group of tasks on a distributed computing framework having multiple clusters; for each task of the group of tasks having a corresponding task type: obtaining one or more selected clusters of the multiple clusters that perform the task, selecting selected resource use information items of the multiple resource use information items that are associated with the task, wherein a resource use information item is associated with a particular task if the resource use information item identifies resources for computing a measure of operational load of performing tasks having the task type, obtaining one or more unit measures associated with the task, wherein each unit measure of the one or more unit measures describes a measure of operational load of performing at least an aspect of tasks having the task type using the one or more selected clusters, and determining a measure of operational load of performing the task on the distributed computing framework based on the one or more selected resource use information items associated with the task and the one or more unit measures associated with the task; combining each measure of operational load to compute a combined measure of operational load for performing the group of tasks on the distributed computing framework; identifying one or more properties of the group of tasks that indicate a need to adjust the combined measure of operational load; and adjusting the combined measure of operational load based on the one or more properties.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The group of tasks include an execution task having an execution task type; the one or more selected resource use information items associated with the execution task include a measure of memory use for the execution task and a measure of execution time for the execution task; the one or more unit measures associated with the execution task include a measure of operational load of using all available execution resources of the one or more selected clusters for a corresponding period of time; and determining the measure of operational load of performing the execution task includes: processing the measure of memory use and the measure of execution time to generate a measure of resource use for the execution task, processing the measure of resource use and the measure of operational load of using all available execution resources of the one or more selected clusters to generate a raw measure of operational load associated with the execution task, obtaining a measure of total execution capability of all available execution resources of the one or more selected clusters for the corresponding period of time, and adjusting the raw measure of operational load using the measure of total execution capability to generate the measure of operational load of performing the execution task.

The group of tasks include a data access task having a data access task type; the one or more selected resource use information items associated with the data access task include a measure of count of accesses to one or more data items stored on the one or more selected clusters; the one or more unit measures associated with the data access task include a measure of operational load of providing capabilities to access the one or more data items for a corresponding period of time; and determining the measure of operational load of performing the data access task includes: obtaining a measure of maximum possible number of accesses to the one or more date items using the capabilities to access the one or more data items during the corresponding period of time, processing the measure of maximum possible number of accesses and the measure of operational load of providing capabilities to access the one or more data items to generate a unit operational load for a single access of the one or more data items, and processing the unit operational load and the measure of count of accesses to generate the measure of operational load of performing the data access task.

The group of tasks include a storage task having a storage task type; the one or more selected resource use information items associated with storage task include a measure of size, in units of a unit size, of data stored by the storage task and a measure of count of files stored by the storage task; the one or more unit measures associated with the storage task include a measure of operational load of storing data having the unit size on the one or more selected clusters and a measure of operational load of storing a file on the one or more selected clusters; determining the measure of operational load of performing the storage task includes: processing the measure of size of data and the measure of operational load of storing data having the unit size to generate a size-based measure of operational load for the storage task, processing the measure of count of files and the measure of operational load of storing a file to generate a count-based measure of operational load for the storage task, and combining the size-based measure and the count-based measure to generate a measure of operational load for the storage task.

The one or more selected resource use information items associated with storage task include a measure of count of blocks of data stored by the storage task; and the method further includes: obtaining a measure of an individual block size on the one or more selected clusters, and adjusting the measure of size of data based on the measure of counts of block and the measure of individual block size to update the measure of size of data. Obtaining the one or more unit measures associated with the task includes: identifying one or more resources within the one or more selected clusters that can perform tasks having the task type; for each of the one or more resources, obtaining an individual measure of operational load associated with the task; and aggregating each individual measure of operational load to generate a unit measure of operational load associated with the task and for the one or more selected clusters.

The one or more properties of the group of tasks include a measure of reduced operational load resulting from lack of use of resources within the one or more selected clusters that were reserved but not used. The one or more properties of the group of tasks include a measure of operational load of requests for future uses of resources. The one or more properties of the group of tasks include a measure of operational load of requests for resources in the one or more selected clusters that have an unusual property. A request has an unusual property when a size of resources associated with the request is below a first threshold, above a second threshold, or both. A request has an unusual property when a ratio of a size of a first group of resources associated with the request and a size of a second group of resources associated with the request is below, a first threshold, above a second threshold, or both.

Particular embodiments of the subject matter described in this specification can be implemented so as to realize one or more of the following advantages. Resource use and operational load of performing computing tasks in distributed computing systems can be analyzed using data produced by monitoring the distributed computing system. A resource cost model used to estimate resource use and operational load can be modified to incentivize particular actions. Resource use and operational load of performing computing tasks using a resource cluster having a variety of types of resources with a variety of unit cost measures can be estimated without the need to monitor internal allocation of resources inside the cluster. Estimating the unit cost measures enables optimization of resource allocation, for example, to improve cost efficiency. Users can choose their job complete at the minimum cost. The system can decide for itself what parameters to tune or which systems to execute the workload. In other words, users can give broad parameters and the system can allocate resources accordingly. Additionally, users can specify priorities and allow the system to tune the parameters to that priority. For example, some users can prioritize speed while others may want to prioritize cost.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
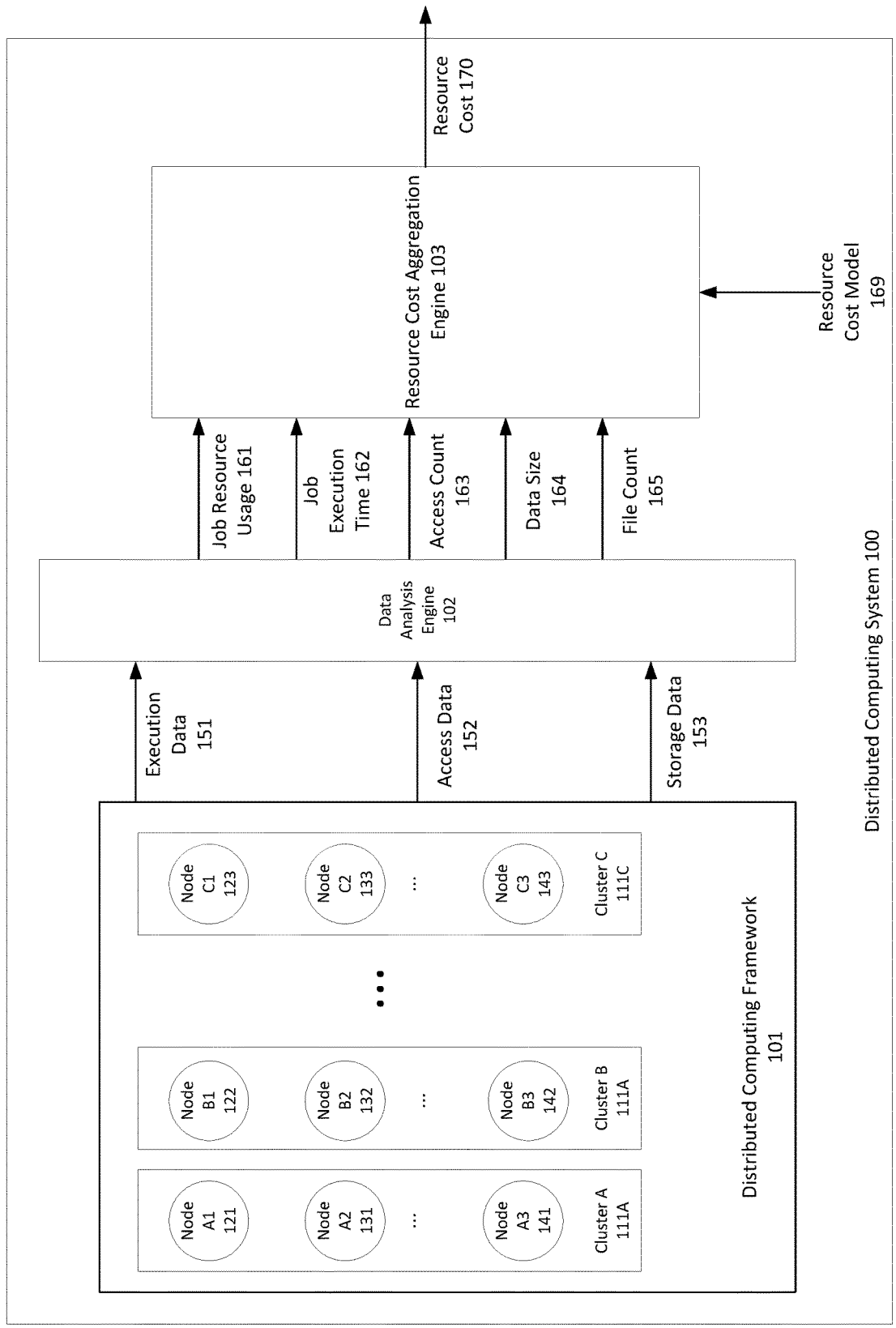
FIG. 1 is a block diagram of an example distributed computing system.

FIG. 1 is a block diagram of an example distributed computing system 100. The distributed computing system 100 is an example of a system implemented as computer programs on one or more computers in one or more locations, in which the systems, components, and techniques described below can be implemented.

The distributed computing system 100 generates measures of resource load, e.g., resource cost 170 of one or more tasks performed by a distributed computing framework 101 in the distributed computing system 100 based on performance data about the operation of the distributed computing framework 101 and a resource cost model 169 for calculating each measure of resource cost 170.

For example, the distributed computing system 100 can generate a measure of execution cost of an execution job, i.e., an execution task, based on performance data about resource usage 161 and execution time 162 associated with the execution job and a resource cost model 169 for generating measures of execution cost.

As another example, the distributed computing system 100 can generate a measure of access cost associated with accessing one or more files on the distributed computing framework 101 based on performance data about access counts 163 of one or more files on the on the distributed computing framework 101 and a resource cost model 169 for generating measures of access cost.

As another example, the distributed computing system 100 can generate a measure of storage cost associated with storing particular data on the distributed computing framework 101 based on performance data about data size 164 and file count 165 of the particular data and count about data size 164 and a resource cost model 169 for generating measures of resource cost.

As yet another example, the distributed computing system 100 can generate measures of combined resource cost for a group of one or more tasks performed using the distributed computing framework 101 based on two or more measures of resource cost 170, e.g., two or more of the measures of execution cost, access cost, and storage cost, in accordance with a resource cost model 160 that instructs the system 100 about how to combine the two or more measures of resource cost 170 to generate a combined measure of resource cost. For example, a resource cost model 169 for generating a particular measure of combined resource cost associated with one or more tasks could instruct the system 100 to combine two or more costs, e.g., all three of, the execution cost, the access cost, and the storage cost associated with the one or more tasks to generate the particular measure of combined resource cost. The two or more costs can be combined, for example, using a sum or weighted sum in which particular costs are assigned particular weights.

The distributed computing system 100 includes the distributed computing framework 101, a data analysis engine 102, and a resource cost aggregation engine 103.

The data analysis engine 102 collects and analyzes performance data about operation of the distributed computing framework 101, and the resource cost aggregation engine 103 uses the performance data to compute measures of resource cost 170 of one or more tasks performed by the distributed computing framework 101, e.g., one or more tasks requested by a particular user of the distributed computing framework 101.

A measure of resource cost 170 of one or more tasks performed by the distributed computing framework 101 describes a burden imposed by performing those tasks on the computing resources of the distributed computing framework 102. For example, estimate of cost for a task may indicate at least one of a monetary cost of using particular resources of the distributed computing framework 101 to perform the task or a cost that using particular resources to perform the task imposes on operation, e.g., speed, reliability, or both, of the distributed computing framework 101.

Examples of measures of resource cost 170 include the execution cost associated with executing a job using the distributed computing framework 101, an access cost associated with accessing one or more files on the distributed computing framework 101, a storage cost associated with storing particular data on the distributed computing framework 101, and a total resource cost associated with one or more tasks that could be the sum of two or more of, e.g., the sum of all three of, the execution cost, the access cost, and the storage cost associated with the one or more tasks.

The distributed computing framework 101 is a collection of one or more computers that provide capabilities for distributed use of computing resources. The distributed computing framework 101 includes one or more clusters, e.g., cluster A 111, cluster B 112, and cluster C 113, where each cluster includes one or more computer nodes, e.g., computer nodes A1-A3 121, 131, 141 on cluster A 111; computer nodes B1-B3 122, 132, 142 on cluster B 112; and computer nodes C1-C3 123, 133, 143 on cluster C 113. In some implementations, the computer nodes of a cluster have homogenous hardware with similar performance characteristics. However, in some implementations, the hardware can be heterogeneous, for example, when some hardware resources of the cluster have been upgraded.

The distributed computing framework 101 can also include capabilities (not shown) that allow a user to interact with the computing resources of the distributed computing framework 101 without dealing with some of the complexities associated with configuration and management of those computing resources. An example of a distributed computing framework 101 is Hadoop. Hadoop is a software framework for storing data and running applications on clusters of hardware. Aspects of the Hadoop reference are explained in Mark Krezner and Sujee Maniyam, *Hadoop Illuminated*, available at https://auburn.instructure.com/files/60173850/download?download_frd=1&verifier=H1K8DwAIkSpb6-Mg9jPWN13hh1xYlgVhBB14dZG3Q, which is incorporated here by reference.

The data analysis engine 102 includes one or more computer programs that collect particular performance data about operation of the distributed computing framework 101. An example of such computer programs is hRaven. hRaven is a software tool that collects statistics about execution of jobs on one or more Hadoop clusters and stores the collected statistics in a format that can be queried by users. Aspects of hRaven related to collecting statistics about compute jobs are described in README.md, available at https://github.com/twitter/hraven/blob/master/README.md, which is incorporated here by reference. Examples of performance data about operation of the distributed computing framework 101 include execution data 151, access data 152, and storage data 153.

The execution data 151 include information about execution of one or more jobs on the computing resources of the distributed computing framework 101. For example, the execution data 151 may include information about how much memory, e.g., in bytes, on each of the nodes of the distributed computing framework 101 was used by each execution job and how long each execution job used each memory resource. Moreover, the execution data 151 may include information about how many processing resources, e.g., in cores, on each of the nodes of the distributed computing framework 101 were used by each execution job and how long each execution job used each processing resource.

The execution data 151 may be generated by a data generation engine within the distributed computing framework 101 or by a separate computer program that monitors performance of the distributed computing framework 101. An example of execution data 151 is the history files generated in Hadoop.

The access data 152 include information about accesses of one or more data files stored on the distributed computing framework 101. For example, the access data 152 may include information about how many times a computer application has accessed a file. An example of access data 152 include a collection of audit logs for NameNodes of a cluster in Hadoop.

The storage data 153 include information about storage of data on the distributed computing framework 101. For example, the storage data 153 may include information about how many files have been stored in one or more file directories, e.g., a global directory and a temporary file directory, at particular points in time and the total size of the data.

The data analysis engine 102 analyzes the performance data to generate resource use data, e.g., data about use of one or more computing resources of the distributed computing framework 101. Examples of resource use data include data about the amount of resource usage 161 by a job, data about execution time 162 of a job on each used resource, data about count of accesses 163 of one or more files, data about size 164 of storage resources used to store one or more files, and data about a number of files 165 used to store particular data on the distributed computing framework 101.

The resource cost aggregation engine 103 uses the resource use data and a resource cost model 169 to generate measures of resource cost 170 for the distributed computing framework 101. The resource cost model 169 includes one or more unit measures of performance cost for each cluster of the distributed commuting framework 101.

A unit measure of performance cost of a particular task for a cluster can be an estimate of the resource cost of performing tasks using a predetermined portion of the resources of the cluster and for a specified amount of time. For example, a unit measure of execution cost for a cluster can be an estimate of resource cost, e.g., memory cost, processor cost, or both, of executing jobs using all available resources of the cluster during a specified time period, e.g., 24 hours. As another example, a unit measure of access cost for a cluster can be an estimate of resource cost, e.g., cost of locating files and subsequently retrieving the files in accordance with the location, of accessing files stored on the cluster during a specified time period, e.g., 24 hours.

A unit measure of storage cost for a cluster can be an estimate of the resource cost, e.g., permanent storage cost, such as hard disk cost, of storing a predetermined amount, e.g., one byte, of data on the cluster. A unit measure of file cost for a cluster can be an estimate of resource cost, e.g., physical overhead of executing tasks required to create a file, storage cost of storing checksum data associated with a file, or both, of creating a predetermined number, e.g., one, of files on the cluster.

The distributed computing system 100 can determine a unit measure of performance cost of a particular task for a particular cluster based on an estimated value of the computing resources in the particular cluster that can perform the particular task. The estimated value of a computing resource may depend on at least one of the monetary value of the computing resource and the importance of the computing resource to one or more operational functionalities of the distributed computing framework 101.

The distributed computing system 100 can adjust a unit measure of performance cost to incentivize or disincentivize particular actions by the users of the distributed computing framework 101. For example, the distributed computing system 100 can increase a unit measure of access cost for a particular cluster in the distributed computing framework 101 to encourage users of the framework 101 to store files that need to be accessed on a frequent basis in other clusters of the framework 101. As another example the distributed computing system 100 can decrease a unit measure of execution cost for a particular cluster in the distributed computing framework 101 to encourage users of the framework 101 to execute jobs on the particular cluster.

In some implementations, the resource cost aggregation engine 103 combines, e.g., aggregates, the measure of access cost and the measure of storage cost to generate a measure of file system cost. In some of those implementations, the resource cost engine combines, e.g., aggregates, the measure of file system cost and the measure of execution cost to generate a measure of total resource cost.

The distributed computing system 100 can also include a feedback loop that can be used to refine calculated measures of cost, perform automatic tuning and debugging and troubleshooting. For example, feedback loop allows for earlier costs to be fed back into the system to help optimize resource allocations at run time. The system can then adjust resource cost estimates based on can have adjustments based on what parts of the system are more currently more expensive to operate.

The auto tuning allows the system to balance resource costs between different resources and optimizations. For example, the system often needs to balance between a resolution between maximizing system throughput and utilization on one hand and maintaining or meeting a minimum latency requirements on the other.

Although the above example focuses on particular resource use data, in some implementations, other types of resource use data can be included in a determining a measure of cost, for example, replication factor, availability domain, and network usage. The replication factor can have a default value, e.g., 3 copies, but users can request different values. For example, a user wanting higher availability so that they can have greater access to replicated data in many location would also require higher costs, e.g., greater storage costs for the additional data copies. Similarly, a user may want a higher number of availability domains, which again increases storage and compute costs. Network usage can vary costs depending on how much data is being transferred over the network for particular jobs and the measure of cost can include a measure of cost for how much bandwidth is being consumed for particular jobs.

As described above, in some implementations clusters can include computer nodes having heterogeneous hardware resources. Instead of having users specify particular resources or update their requested resources when the hardware is changes, users can specify particular performance requirements. The system can automatically scale the hardware resources up or down to satisfy the performance requirements and calculate a corresponding measure of cost to satisfy the performance requirements. For example, a user can specify a particular level number of virtual cores, a particular throughput requirement, or other performance parameters such as latency. The system can them map the request to the particular available hardware resources. A request for a particular processing speed might correspond to one newer machine or two older machines in the same cluster. Thus, the actual hardware assigned can be scaled to meet the performance requirements.

In an example where the user specifies a performance characteristic, for example, relating to how fast the task is performed, the number of cores can be selected to meet that performance requirement. The number of cores can depend on the characteristics of the machines used for the task. For example, older machines that have slower performance may require more cores while newer, faster performing machines may require fewer cores. The resource costs associated with the requested task parameters can be positive or negative depending on the relative cost assigned to each kind of machine. In optimizing the resources based on performance rather than cost, the configurations can be optimized to meet that requirement. Thus, the user could expect their task to finish in some fixed amount of time regardless of the particular hardware the task is executing on.

Figure 2:
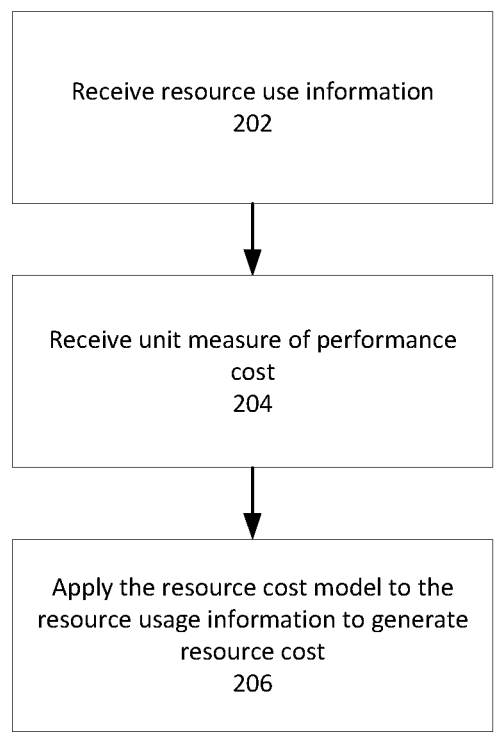
FIG. 2 is a flow diagram of an example process for generating a measure of resource cost.

FIG. 2 is a flow diagram of an example process for generating a measure of resource cost. For convenience, the process will be described as being performed by a system of one or more computers located in one or more locations. For example, a distributed computing system, e.g., the distributed computing system 100 of FIG. 1, appropriately programmed in accordance with this specification, can perform the process.

The system receives resource use information for a task (202). The resource use information for a task can identify one or more computing resources of the system used to perform the task and include an estimate of an amount of use of those resources to perform the task.

For example, the resource use information for an execution task can identify which clusters the system uses to perform the execution task, how long the system uses each cluster to perform the task, and how much of the memory resource of each cluster the system uses to perform the task. The resource use information for an access task can identify which clusters the system accesses files on to perform the task and how many accesses the system performs on each cluster to perform the task. The resource use information for a storage task can identify which clusters the system stores data on to perform the task, how much data is stored on each cluster to perform the task, and how many files are stored on each cluster to perform the task.

The system receives, from a resource cost model, a unit measure of performance cost for the task (204). For example, the system can receive a unit measure of execution cost for an execution task, a unit measure of access cost for an access task, and a unit measure of storage cost for a storage task.

A unit measure of performance cost of a particular task for a cluster can be an estimate of the resource cost of performing tasks using a specified portion of the resources of the cluster and for a specified amount of time. The system may generate units measures of performance cost for clusters based on one or more properties, e.g., type, speed, etc., of resources in the cluster. As described above, the system may allow a user of the system to adjust unit measures of performance cost to incentivize or disincentivize particular actions by the users.

The system applies the resource cost model to the resource use information to generate a measure of resource cost for the particular task (206). The system can generate the measure of resource cost by applying the resource cost model to the resource use information in accordance with a cost computation formula for the measure of resource cost, where at least some of the factors of the formula are one or more elements of the resource use information and the resource cost model.

In other words, the system can maintain a cost computation formula for each measure of resource cost and supplies as inputs to the formula particular resource use information and particular information obtained from the resource cost model, such as the unit measures of resource cost. The system then computes as a particular measure of resource cost the output of the formula for the particular measure of resource cost based on inputs supplied using the particular resource use information and the particular information obtained from the resource cost model. Thus, the formula for each measure of resource cost can describe: (i) which resource use information and information obtained from resource cost models the system uses to generate each measure of resource cost; and (ii) how the system uses the noted information to generate the noted measure of resource cost.

Figure 3:
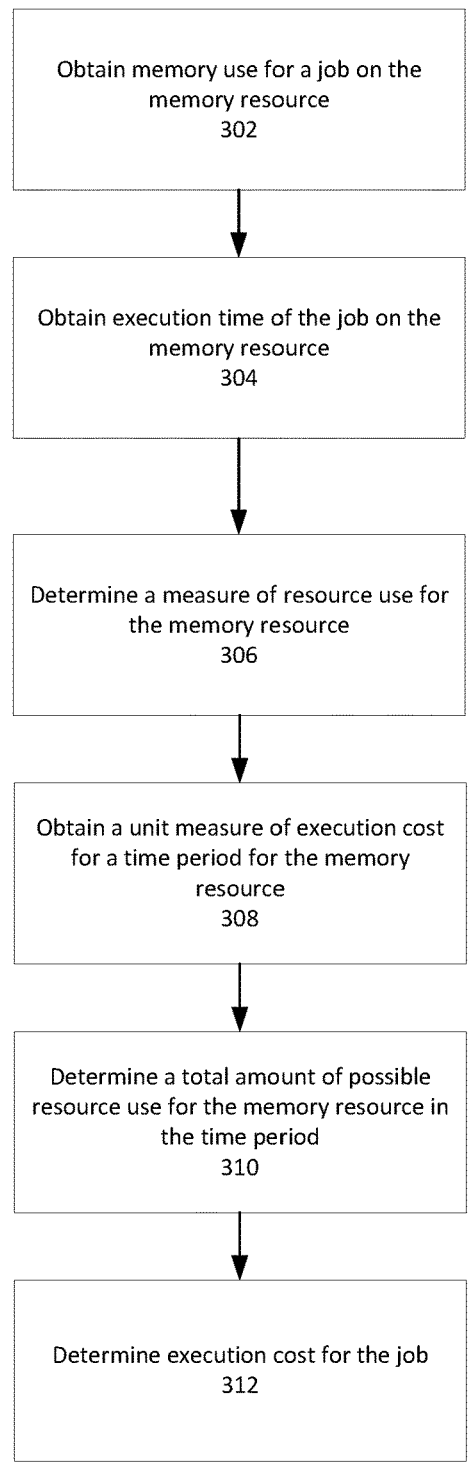
FIG. 3 is a flow diagram of an example process for generating a measure of execution cost.
Figure 4:
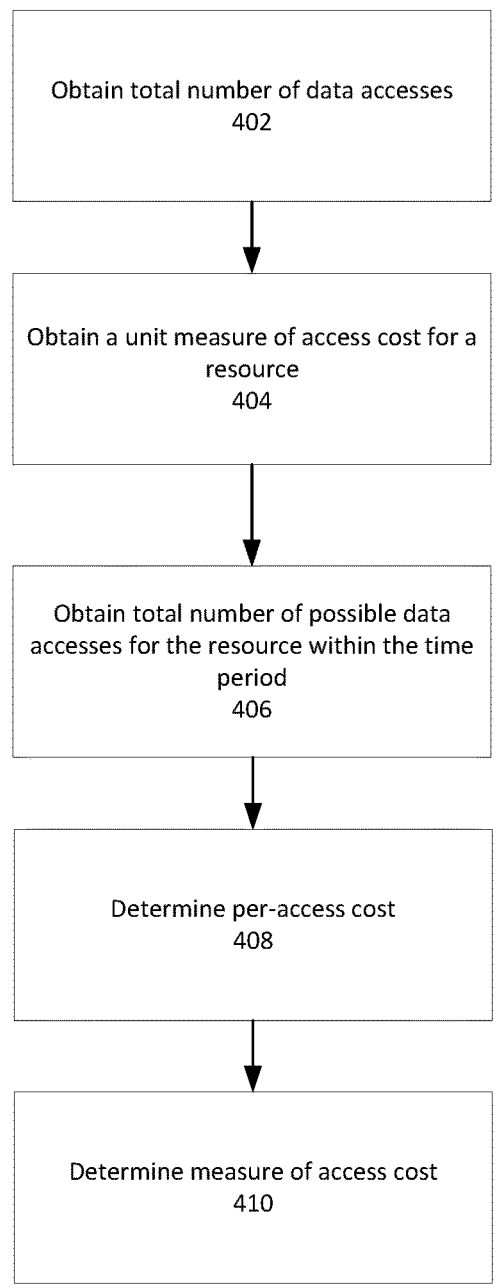
FIG. 4 is a flow diagram of an example process for generating a measure of access cost.
Figure 5:
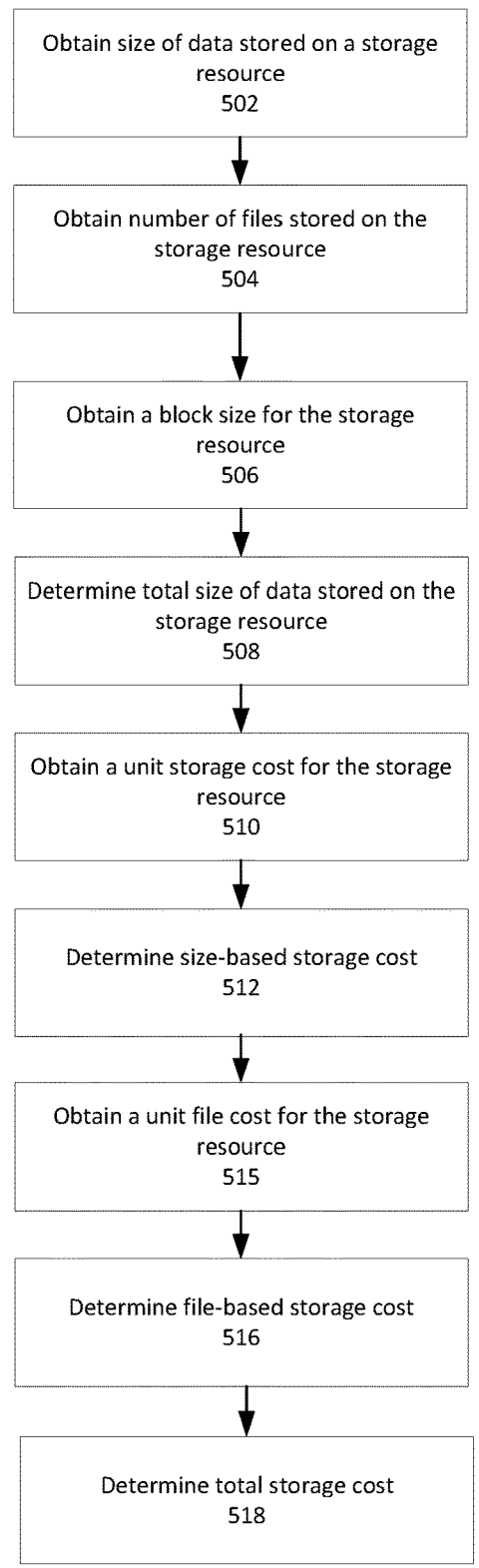
FIG. 5 is a flow diagram of an example process for generating a measure of storage cost.

Examples of such formulas are described below with reference to FIGS. 3-5. FIG. 3 describes an example cost computational formula for computing a measure of execution cost. FIG. 4 describes an example cost computational formula for computing a measure of access cost. FIG. 5 describes an example cost computational formula for computing a measure of storage cost.

FIG. 3 is a flow diagram of an example process for generating a measure of execution cost. For convenience, the process will be described as being performed by a system of one or more computers located in one or more locations. For example, a distributed computing system, e.g., the distributed computing system 100 of FIG. 1, appropriately programmed in accordance with this specification, can perform the process.

FIG. 3 uses the example of memory usage to illustrate the generation of the measure of execution cost. However, this process can be used in a similar manner for generating the measure of execution cost for other resources, including processor usage, e.g., CPU or GPU, network bandwidth, or other resources.

The system obtains memory use information that quantifies an amount of one or more memory resources of the system used to perform a particular job (302). For example, the system can obtain information that indicates that the system has used 10 megabytes of memory of a first cluster to perform the particular job.

The system obtains execution time information about how long the system used the one or more memory resources to perform the particular job (304). For example, the system can obtain information that indicates that the system has used the memory of a first cluster for one millisecond.

The system determines a measure of resource use for the one or more memory resources (306) using the memory use information pertaining to the memory resource and the execution time information pertaining to the memory resource, e.g., by multiplying the memory use information by the execution time information.

In some implementations, the system determines the measure of resource use for the memory resource in a unit that indicates the use of a certain amount of memory for a particular amount of time, such as a megabyte-milliseconds.

The system obtains, from a resource cost model, a unit measure of execution cost for the used memory resource for a time period (308) and determines a total amount of available use of the memory resource during the time period for performing execution jobs (310).

For example, the system can obtain a unit measure of execution cost for memory of a first cluster having a total of 1024 megabytes of memory for a 24-hour time period. The total amount of possible resource use for the memory of the first cluster for the time period, in megabyte-milliseconds, can be 1024 megabytes×24 hours×60 minutes/hour×60 seconds/minute×1000 milliseconds/second.

The system determines execution cost for the job (312) based on the measure of resource use for the memory resource, the unit measure of execution cost for the memory resource, and the total amount of possible resource use for the memory resource.

In some implementations, the system multiplies the corresponding measure of resource use by the corresponding unit measure of execution cost and divides the product of the multiplication by the corresponding total amount of possible resource use to generate the execution cost for the execution job.

FIG. 4 is a flow diagram of an example process for generating a measure of access cost. For convenience, the process will be described as being performed by a system of one or more computers located in one or more locations. For example, a distributed computing system, e.g., the distributed computing system 100 of FIG. 1, appropriately programmed in accordance with this specification, can perform the process.

The system obtains a total number of accesses to files stored on a storage resource to perform an access task (402). For example, the system can obtain information indicating that, to perform a particular access task, the system has accessed files in a first cluster 200 times.

The system obtains, from a resource cost model, a unit measure of access cost for accessing files stored on the storage resource within a time period (404) and obtains a total number of possible data accesses for the storage resource within the time period (406). The total number of possible data accesses for the storage resource may depend on an extent of the capability of the storage resource to process multiple data accesses at the same time.

For example, the system can obtain information indicating a cluster can process 20 data accesses every second. The system can use that information to determine that, within a 24-hour time period, the cluster can process 20×24 hours×60 minutes/hour×60 seconds/minute data accesses.

The system determines a per-access cost for accessing files on the storage resource (408) based on the unit measure of access cost for the storage resource and the total number of possible data accesses for the storage resources. For example, the system can divide the unit measure of access for a time period by the total number of possible accesses for the time period to determine the per-access cost for the corresponding storage resource.

The system generates the measure of access cost for accessing files stored on the storage resource to perform the access task (410) using the per-access cost for the storage resource and the total number of accesses to the files stored on the storage cost to perform the access task. For example, the system can multiply the per-access cost by the total number of accesses to generate the measure of access cost.

In some implementations, per-access cost is a fixed cost per access regardless of the type of operation being performed. However in some other implementations, the access cost for particular accesses or namespace queries can vary depending on the type of operation being performed. For example, a query to list files in a directory having a small number of files is less computationally expensive than a query to list files in a directory having a large number of files. Additionally, in some further implementations, requests can be initially analyzed to estimate how computationally expensive the access request is. This analysis can be constrained by a specified max evaluation time.

FIG. 5 is a flow diagram of an example process for generating a measure of storage cost. For convenience, the process will be described as being performed by a system of one or more computers located in one or more locations. For example, a distributed computing system, e.g., the distributed computing system 100 of FIG. 1, appropriately programmed in accordance with this specification, can perform the process.

The system obtains a size (502) and a number of files (504) of particular data stored on a storage resource to perform a storage task. The system also obtains a size of a block of data stored on a storage resource (506). For each block of data, the system stores a corresponding metadata information unit.

The system determines a total size of data that the system stores on the storage resource to perform the storage task (506). The total size can be a combination, e.g., aggregation, of the size of the particular data and the sizes of any metadata information units stored for each block that includes at least a portion of the particular data.

In some implementations, the system determines a number of metadata information units associated with the data stored on the storage resource and multiplies the number of metadata information units by the size of each metadata information unit, e.g., 1024 megabytes, to generate the total size of data the system stores on the storage resources to perform the storage tasks. To determine the number of metadata information units, the system can divide the size of the particular data by the block size for the storage resource to determine a computed measure of the number of metadata information units.

In some implementations, a file will always have at least one corresponding metadata information unit. Therefore, in some of those implementations, the system compares the computed measure of the number of metadata information units with the number of files of data stored on the storage resource. In response to determining, based on the comparison, that the number of metadata information units is lower than the number of files, the system updates the number of the metadata information units to the number of files. In other words, the system adopts the maximum of the computed measure of the number of metadata information units and the number of files as the number of metadata information units.

The system obtains, from a resource cost model, a unit storage cost for the storage resource (508) and determines a size-based storage cost (510) from the total size of data stored on the storage resource and the unit storage cost for the storage resource. The size-based storage cost for the stored data is an estimate of resource cost of storing the particular data on the storage resource based on the size of the particular data and the metadata information units associated the particular data. For example, the system can multiply the total size of data stored on the storage resource and the unit storage cost for the storage resource to generate the size-based storage cost for storing the data on the storage cost.

The system obtains, from the resource cost model, a unit file cost for the storage resource (512) and applies the unit file cost to the obtained number of files of the particular data, e.g., by multiplying the two values, to determine a file-based storage cost for the stored data (514). The file-based storage cost for the storage data is an estimate of resource cost of storing the particular data on the storage resource because of the number of files of data.

The system combines, e.g., aggregates, the size-based storage cost and the file-based storage cost to generate a measure of storage cost of storing the particular data on the storage resource (516).

Figure 6:
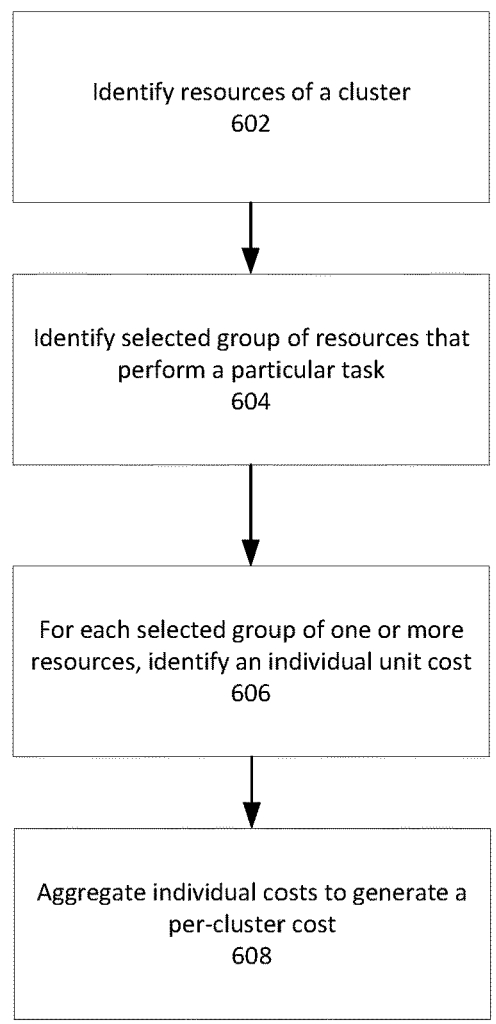
FIG. 6 is a flow diagram of an example process for generating a unit measure of performance cost.

FIG. 6 is a flow diagram of an example process for generating a unit measure of performance cost. For convenience, the process will be described as being performed by a system of one or more computers located in one or more locations. For example, a distributed computing system, e.g., the distributed computing system 100 of FIG. 1, appropriately programmed in accordance with this specification, can perform the process.

The system identifies resources of a cluster (602) and, among those resources, identifies selected groups of one or more resources that each can perform tasks corresponding to a particular unit measure of performance cost (604). For example, for an execution task, the system identifies selected groups of one or more resources that each can perform an execution task, e.g., a portion of the cluster that perform execution-type tasks.

For each selected group, the system obtains an individual measure of unit performance cost (606) and aggregates, e.g., averages, each individual measure of unit performance cost to generate a per-cluster measure of performance cost (608).

Generating a uniform per-cluster measure of performance cost can allow the system to estimate costs of performing tasks in a cluster that has multiple groups of resources with different measures of unit performance cost without the need to trace which particular groups of resources the system has used to perform a particular task. By estimating a per-cluster unit cost of performing a particular task that is representative of the variety of the unit costs of the resources within the cluster, the system can increase the accuracy of resource cost estimation without creating a need for significant improvements in monitoring capabilities.

Figure 7:
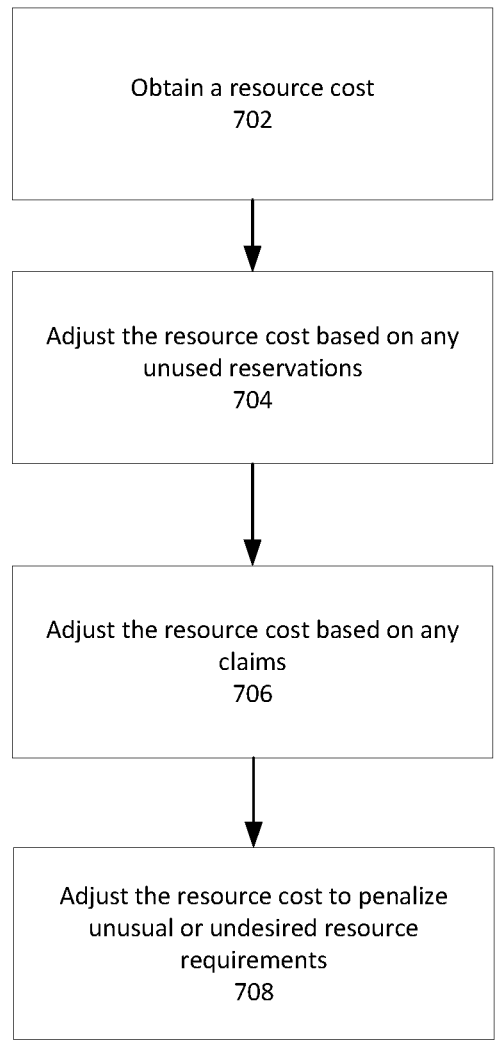
FIG. 7 is a flow diagram of an example process for adjusting a measure of resource cost.

FIG. 7 is a flow diagram of an example process for adjusting a measure of resource cost. For convenience, the process will be described as being performed by a system of one or more computers located in one or more locations. For example, a distributed computing system, e.g., the distributed computing system 100 of FIG. 1, appropriately programmed in accordance with this specification, can perform the process.

The system obtains the measure of resource cost (702) and adjusts the measure of resource cost based on any unused reservations (704) associated with a particular task associated with the measure of resource cost.

In some implementations, a task can reserve computing resources for use but may not use some or all of the reserved computing resources. The system can adjust the measure of resource cost to take into a cost to the system of reserving computing resources and/or to penalize reserving resources without using them. However, in order to avoid incentivizing wasteful use of all reserved resources, the system may have a measure of cost for reserving computing resources that is lower than a measure of cost for using computing resources. The system can then allocate some or all of the computing resources reserved by a task but not used by a task to other tasks performed by the system.

The system adjusts the measure of resource cost based on any claims to resources (706). In some implementations, a task can request a particular amount of computing resources that is not available at the time of request for use upon availability. Such a request is referred to as a claim and can impose a cost on the system that has to hold partially available computing resources open for a period of time until the unavailable segment of the computing resources also become available. The system can adjust the measure of resource cost to take into account a cost to the system of holding resources to respond to such claims and/or to penalize such requests.

The system adjusts the measure of resource cost based on unusual or undesired resource requirements (708). The system may have a pre-existing expectation of the various resource requirements of tasks. For example, the system may expect that there is some degree of correlation between how much memory and how much processing power performing a task requires. When a task has resource requirements that do not fit the profile, the system may have to incur resource costs to accommodate the task given the fact that it has incorrectly predicted resource requirements of the task. The system can adjust the measure of resource cost to take into account a cost to the system of such unusual resource requirements and/or to penalize such requirements.

For example, an undesired resource requirement can include request for odd amounts of storage or memory space rather than preferred blocks, e.g., requesting 1.734 GB of memory instead of 2 GB. Fulfilling the requests can result in unused fragments that reduce efficiency and increase overall costs. The resource cost estimates can take such undesired requirements into account to penalize the requirements and lead requestors to more economical resource blocks.

In another example, an unusual resource request can include a request for a lot of memory but few or no processing cores. This limits the ability to have other user jobs on the machine even though processing cores may be available. The system can set minimum combinations or predefined packages of memory and processing combinations that have a favorable cost relative to custom requests by a user.

In this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable destination apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) destination, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
collecting, from a distributed computing framework comprising a plurality of computer nodes, runtime output relating to a plurality of jobs performed on the distributed computing framework;
arranging the runtime output into a plurality of data items comprising (a) execution data representing execution history of the plurality of jobs on the distributed computing framework, (b) access data representing a record of events and changes performed by the plurality of jobs in the distributed computing framework by the plurality of jobs, and (c) storage data representing an amount of data stored in the distributed computing framework at particular points in time;
determining, from the plurality of data items, a plurality of metrics comprising:
(a) one or more execution data metrics determined from the execution history, wherein the one or more execution data metrics comprise one or more of (i) amount of memory resources within the plurality of nodes that is consumed by each job of the plurality of jobs, or (ii) amount of time for which each memory resource is consumed to execute a respective job of the plurality of jobs;

(b) one or more access data metrics determined from the record of events and changes, wherein the one or more access data metrics comprise a number of times the plurality of jobs access one or more particular files in the distributed computing framework; and (c) one or more storage data metrics determined from the storage data, wherein the one or more storage data metrics comprise one or more of (i) a number of files stored in one or more particular file directories within the distributed computing framework at particular points in time, or (ii) a size of the files stored in the one or more particular file directories;

determining, for each job of the plurality of jobs, an execution cost based on the one or more execution metrics, an access cost based on the one or more access metrics, and a storage cost based on the one or more storage metrics;

combining, for each job of the plurality of jobs, the execution cost, the access cost and the storage cost to compute a combined cost for each job of the plurality of jobs; and outputting the combined cost for each job of the plurality of jobs.

2. The method of claim 1, wherein the plurality of jobs are performed for a single computer application running on the distributed computing framework, wherein the combined cost indicates a computational cost incurred by the single computer application.

3. The method of claim 1, further comprising:
determining information indicating one or more of (a) a variation beyond a threshold value in usage, by a set of one or more jobs, of one or more resources of the distributed computing framework that are allocated for use by the one or more jobs, (b) receipt of a request for additional resources of the distributed computing framework for the one or more jobs, or (c) whether one or more resources of the distributed computing framework that are allocated for use by the one or more jobs are insufficient;

updating, in response to the determining of the information that indicates a change in one or more resources, the plurality of metrics, the cost for each job of the plurality of jobs, and the combined cost for the plurality of jobs; and outputting the updated combined cost for each job of the plurality of jobs.

4. The method of claim 1, wherein combining of the cost of each data item to compute the combined cost comprises adding a weighted value of the cost of each job of the plurality of jobs.

5. The method of claim 1, wherein the combining of the execution cost, the access cost and the storage cost to compute the combined cost is performed in accordance with instructions received from a resource cost model.

6. A system comprising:
one or more computers and one or more storage devices storing instructions that are operable, when executed by the one or more computers, to cause the one or more computers to perform operations comprising:
collecting, from a distributed computing framework comprising a plurality of computer nodes, runtime output relating to a plurality of jobs performed on the distributed computing framework;

arranging the runtime output into a plurality of data items comprising (a) execution data representing execution history of the plurality of jobs on the distributed computing framework, (b) access data representing a record of events and changes performed by the plurality of jobs in the distributed computing framework by the plurality of jobs, and (c) storage data representing an amount of data stored in the distributed computing framework at particular points in time;

determining, from the plurality of data items, a plurality of metrics comprising:

(a) one or more execution data metrics determined from the execution history, wherein the one or more execution data metrics comprise one or more of (i) amount of memory resources within the plurality of nodes that is consumed by each job of the plurality of jobs, or (ii) amount of time for which each memory resource is consumed to execute a respective job of the plurality of jobs;

(b) one or more access data metrics determined from the record of events and changes, wherein the one or more access data metrics comprise a number of times the plurality of jobs access one or more particular files in the distributed computing framework; and (c) one or more storage data metrics determined from the storage data, wherein the one or more storage data metrics comprise one or more of (i) a number of files stored in one or more particular file directories within the distributed computing framework at particular points in time, or (ii) a size of the files stored in the one or more particular file directories;

determining, for each job of the plurality of jobs, an execution cost based on the one or more execution metrics, an access cost based on the one or more access metrics, and a storage cost based on the one or more storage metrics;

combining, for each job of the plurality of jobs, the execution cost, the access cost and the storage cost to compute a combined cost for each job of the plurality of jobs; and outputting the combined cost for each job of the plurality of jobs.

7. The system of claim 6, wherein the plurality of jobs are performed for a single computer application running on the distributed computing framework, wherein the combined cost indicates a computational cost incurred by the single computer application.

8. The system of claim 6, further comprising:
determining information indicating one or more of (a) a variation beyond a threshold value in usage, by a set of one or more jobs, of one or more resources of the distributed computing framework that are allocated for use by the one or more jobs, (b) receipt of a request for additional resources of the distributed computing framework for the one or more jobs, or (c) whether one or more resources of the distributed computing framework that are allocated for use by the one or more jobs are insufficient;

updating, in response to the determining of the information that indicates a change in one or more resources, the plurality of metrics, the cost for each job of the plurality of jobs, and the combined cost for the plurality of jobs; and outputting the updated combined cost for each job of the plurality of jobs.

9. The system of claim 6, wherein combining of the cost of each data item to compute the combined cost comprises adding a weighted value of the cost of each data item.

10. The system of claim 6, wherein the combining of the execution cost, the access cost and the storage cost to compute the combined cost is performed in accordance with instructions received from a resource cost model.

11. One or more non-transitory computer-readable storage media encoded with instructions that, when executed by one or more computers, cause the one or more computers to perform operations comprising:

collecting, from a distributed computing framework comprising a plurality of computer nodes, runtime output relating to a plurality of jobs performed on the distributed computing framework;

arranging the runtime output into a plurality of data items comprising (a) execution data representing execution history of the plurality of jobs on the distributed computing framework, (b) access data representing a record of events and changes performed by the plurality of jobs in the distributed computing framework by the plurality of jobs, and (c) storage data representing an amount of data stored in the distributed computing framework at particular points in time;

determining, from the plurality of data items, a plurality of metrics comprising:

(a) one or more execution data metrics determined from the execution history, wherein the one or more execution data metrics comprise one or more of (i) amount of memory resources within the plurality of nodes that is consumed by each job of the plurality of jobs, or (ii) amount of time for which each memory resource is consumed to execute a respective job of the plurality of jobs;

(b) one or more access data metrics determined from the record of events and changes, wherein the one or more access data metrics comprise a number of times the plurality of jobs access one or more particular files in the distributed computing framework; and (c) one or more storage data metrics determined from the storage data, wherein the one or more storage data metrics comprise one or more of (i) a number of files stored in one or more particular file directories within the distributed computing framework at particular points in time, or (ii) a size of the files stored in the one or more particular file directories;

determining, for each job of the plurality of jobs, an execution cost based on the one or more execution metrics, an access cost based on the one or more access metrics, and a storage cost based on the one or more storage metrics;

combining, for each job of the plurality of jobs, the execution cost, the access cost and the storage cost to compute a combined cost for each job of the plurality of jobs; and outputting the combined cost for each job of the plurality of jobs.

12. The one or more non-transitory computer-readable storage media of claim 11, wherein the plurality of jobs are performed for a single computer application running on the distributed computing framework, wherein the combined cost indicates a computational cost incurred by the single computer application.

13. The one or more non-transitory computer-readable storage media of claim 11, further comprising:

determining information indicating one or more of (a) a variation beyond a threshold value in usage, by a set of one or more jobs, of one or more resources of the distributed computing framework that are allocated for use by the one or more jobs, (b) receipt of a request for additional resources of the distributed computing framework for the one or more jobs, or (c) a computational inadequacy of one or more resources of the distributed computing framework that are allocated for use by the one or more jobs;

updating, in response to the determining of the information, the plurality of metrics, the cost for each job of the plurality of jobs, and the combined cost for the plurality of jobs; and outputting the updated combined cost for each job of the plurality of jobs.

14. The one or more non-transitory computer-readable storage media of claim 11, wherein combining of the cost of each data item to compute the combined cost comprises adding a weighted value of the cost of each data item.

15. The one or more non-transitory computer-readable storage media of claim 11, wherein the combining of the execution cost, the access cost and the storage cost to compute the combined cost is performed in accordance with instructions received from a resource cost model.

* * * * *